United States Patent Office 3,491,079
Patented Jan. 20, 1970

3,491,079
VULCANIZATION OF POLYMERS
Douglas C. Edwards, Sarnia, Ontario, Canada, assignor to Polymer Corporation Limited, Sarnia, Ontario, Canada, a body corporate and politic
No Drawing. Filed Feb. 17, 1967, Ser. No. 616,776
Claims priority, application Canada, Mar. 12, 1966, 954,556
Int. Cl. C08c *11/44;* C08d *9/08*
U.S. Cl. 260—94.7                                       9 Claims

ABSTRACT OF THE DISCLOSURE

A liquid butadiene polymer having allylic halide groups is mixed with an amine salt which on contact with moisture is capable of linking molecules of said liquid polymer. The above mixture is contacted with moisture to vulcanize the liquid polymer. The mixture may also contain a compound which, when contacted with moisture, reacts with the acid portion of said amine salt and releases the parent amine for vulcanization.

---

This invention relates to terminally-active liquid polymers of diolefinic hydrocarbon monomers and particularly to vulcanizates of these polymers.

In this specification, "liquid" polymers are defined broadly as polymers having intrinsic viscosities in toluene at 30° C. of about 0.04–1.0, and "vulcanizates" are the reaction products of the liquid polymer with compounds which are capable of linking molecules of the liquid polymer.

In the practical development of sealant compositions, very great importance is attached to so-called "one-component" cures. The term refers to compositions which remain uncured for prolonged periods during storage in a closed container, but cure upon exposure to the atmosphere. Such compositions are of particular value in the field of construction sealants; they eliminate any requirement for on-site mixing, and obviate, as well, the problems of limited "pot-life" in two-component systems.

Of existing sealant types, one-component systems based on silicone polymers are available. These are moisture-activated and appear, from the patent literature, to depend on a reaction of the type $$\sim\text{SiOH} + \text{RSi(OAc)}_3 \xrightarrow{\text{H}_2\text{O}} \sim\text{SiOSiR(OAc)}_2 + \text{AcOH}$$

R being an alkyl radical and Ac representing the $$\text{CH}_3\text{---CO}$$

radical. Vulcanization occurs within an hour or two following exposure. These systems are suitable for small-scale applications or household use, but are prohibitively expensive for large volume applications.

One-component urethane sealants are available, based on the reaction of moisture with terminal $\sim$NCO groups to give $\sim\text{NH}_2 + \text{CO}_2$ followed by $$\sim\text{NH}_2 + \text{OCN}\sim \rightarrow \sim\text{NH---CO---NH}\sim$$

The generation of $\text{CO}_2$ causes porosity problems.

One-component polysulphide systems are also available, but require a month or more to cure. Available patent literature does not disclose the mechanism, however catalyzed atmospheric oxidation of $$2\text{RHS} \rightarrow \text{RSSR} + \text{H}_2\text{O}$$

would appear likely.

It has been found that a more attractive one-component sealant composition is provided by a substantially anhydrous mixture comprised of (a) a major amount of an aqueous emulsion polymerized undegraded olefinically unsaturated unvulcanized liquid polymer composition containing molecules comprising a polymerized $C_4$–$C_8$ diolefinic hydrocarbon compound, a major proportion of said molecules being characterized by the presence of two separated $$-\overset{|}{\text{C}}=\overset{|}{\text{C}}-\overset{|}{\text{C}}-\text{X}$$

structures within their molecular structures, where X is a halogen atom selected from bromine, chlorine and iodine, said liquid polymer composition being characterized by an intrinsic viscosity within the range of 0.04–1.0 when measured in toluene at 30° C. and (b) a minor amount of an amine salt which on contact with moisture is made capable of linking molecules of said liquid polymer.

The liquid polymer compositions may be prepared by a process comprising causing a monomer system comprising a $C_4$–$C_8$ diolefinic hydrocarbon compound to polymerize under aqueous emulsion polymerization conditions in the presence of at least about 0.15 mole per 100 moles of monomer, of compound of the type X(Y)Z where X is Br, I or Cl; Z is —$CBr_3$, —$CCl_3$, —$CI_3$ or $>CI_2$; Y is a radical having a structure selected from the group consisting of $$(-\overset{|}{\text{C}}-\text{C}=\text{C}-), \ (-\overset{|}{\text{C}}-\overset{|}{\underset{-\text{C}-}{\text{C}}}-), \ (-\overset{|}{\text{C}}-\text{C}=\text{C}-\text{R}-) \text{ and } (-\overset{|}{\text{C}}-\overset{|}{\underset{-\text{C}-}{\text{C}}}-\text{R}-)$$

where R is a hydrocarbon or substituted hydrocarbon radical having a molecular weight of from 14 up to about 1000, to obtain a latex of said polymer and recovering the polymer from said latex.

The liquid polymer compositions are substances ranging in consistency from pourable liquids to highly viscous or vaseline-like materials at room temperature. They have intrinsic viscosities as measured in toluene at 30° C. ranging from 0.04 to 1.0 and preferably from 0.05 to 0.6. Although the ideal polymer compositions are characterized by the presence of an allylic halogen atom at or near each end of every polymer molecule, large scale commercial practice may make the ideal impractical of attainment since not all molecules may be so characterized. It has been found that excellent properties may be obtained with compositions wherein only a major proportion of the molecules are thus characterized with the remaining molecules being monofunctional, i.e. having only one terminal group containing an allylic halogen atom and including the possible presence of a minor proportion which may be halogen-free in the terminal groupings.

The presence of the allylic halogen atoms at or near the terminal carbon atoms of the polymer chains imparts a considerable degree of vulcanization activity to the polymers when contacted with multi-functional compounds, i.e. compounds having a functionality of two or more such as multi-functional amines which are capable of reacting with the halogen atoms to cause a linking of the polymer molecules and thus convert the liquid polymers into elastomeric end products. Broadly, the halogen content of the unvulcanized polymers will fall within the range of 1 to 15 weight percent of the total weight of the polymer composition and preferably within the range of 1.5 to 10 weight percent.

Depending on the molecular weight of the raw polymer and the manner in which it has been compounded, the compositions may be subject to cold flow on standing prior to vulcanization. In some applications, this characteristic of cold flow may be undesirable and may be overcome by the additional incorporation of up to about 25 parts by weight, and preferably 5–20 parts by weight, of materials which impart thixotropic properties to the polymer compositions. Materials such as polyethylene, polypropylene, ethylene-propylene copolymer containing more than about 80 mole percent ethylene, ethylene-vinyl acetate copolymer, trans-1,4 polyisoprene and trans-1,4 polybutadiene have been found to be suitable. For example, about 10 parts of polyethylene per 100 parts by weight of a polymer having an intrinsic viscosity of about 0.4 effectively eliminates cold flow with the composition still retaining its softness and easy-working character. These materials may be incorporated directly in the liquid polymer or by adding as a solution in or mixture with a solvent such as an oil which is compatible with the liquid polymer.

As specified earlier, a portion of the liquid polymer's molecular structure is comprised of a polymerized $C_4$–$C_8$ dienic hydrocarbon compound. Preferably the polymerized diene forms a major proportion of the polymer. More than one dienic hydrocarbon compound may be employed to form the dienic portion of the liquid polymers, and when the polymer is a copolymer of a diolefin and a mono-olefin, more than one mono-olefinic monomer may be used to form the non-dienic portion of the polymer. The $C_4$–$C_8$ dienes which may be employed include conjugated dienes such as butadiene-1,3; 2-methyl butadiene-1,3; pentadiene-1,3; hexadiene-1,3; 2,3-hexadiene-1,3; 2-chloro-butadiene-1,3 and 2,3-dimethyl butadiene-1,3 with butadiene-1,3 being preferred. The mono-olefinic monomers include compounds such as styrene, acrylonitrile and methyl methacrylate. Of the various liquid homo-polymers and co-polymers which may be prepared by the process of this invention, those containing a major proportion of polymerized butadiene-1,3 are preferred.

In preparing the halogen-containing liquid polymers, the polymerizable monomer system is emulsified in water and caused to polymerize in the presence of a compound of the type X(Y)Z where X is Br, I or Cl; Z is —$CBr_3$, —$CCl_3$ —$CI_3$ or >$CI_2$; Y is radical having a structure selected from the group consisting of

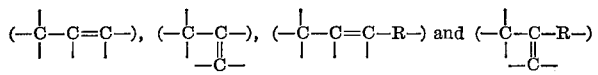

where R is a hydrocarbon or substituted hydrocarbon radical having a molecular weight of from 14 up to about 1000. While the X(Y)Z type compound is thermally decomposable to form free-radicals capable of initiating the polymerization of the monomers, the polymerization is preferably initiated by the decomposition of free-radical forming compounds of the conventional type employed in aqueous emulsion polymerizations such as the peroxygen initiators. The amount of the X(Y)Z type compound required to be used will vary depending on the type of compound employed and the viscosity desired in the halogen-containing liquid polymer which is to be prepared. The amount should be at least 0.15 mole of compound per 100 moles of monomer. While more may be used, the amount generally will not exceed about 6.5 moles per 100 moles of monomer. As indicated earlier, the type of compound, i.e. the degree of its activity, will be a determining factor regarding the amount employed since not all compounds are equally active. For example, when the X(Y)Z halogen compound is of the type $Br_3$C-(polybutadiene-1,3 radical)-Br where the polybutadiene-1,3 radical is 2–10 butadiene units long with the butadiene being polymerized through the 1 and 4 carbon atoms, at least 0.5 mole should be employed and preferably 0.8–6.5 moles when the monomer system to be polymerized consists of butadiene-1,3 only. When the compound is of the type $I_2$H C-(polybutadiene-1,3 radical)-I where the radical and the monomer system are each as described for the preceding example, at least 0.15 mole of compound should be used and preferably 0.25–2.0 moles since this compound is more active. The foregoing compounds will result in the production of excellent liquid polymers. The required proportion for each combination of halogen compound and polymerizable monomer system can be easily determined by simple preliminary testing.

When employing anionic emulsifiers for the polymerization reaction, it may be desirable to include a buffering compound to maintain the pH of the system alkaline. If desired, there may also be present a small amount of a $C_{12}$–$C_{16}$ mercaptan. Examples of suitable conventional polymerization initiators are cumene hydroperoxide, diisopropylbenzene hydroperoxide, azo-bis-isobutyronitrile, potassium persulfate and sodium persulfate and the amount used may vary widely, e.g. 0.1–5.0% by weight of the monomers. The presence of the X(Y)Z type compound is essential during the polymerization reaction for the formation of the halogen-containing liquid polymers of the present invention.

The polymerization reaction may be carried out broadly speaking at any temperature from about 5° C. to about 80° C. or higher. Product properties such as tensile strength and sol-gel behaviour of the vulcanizates are improved progressively with increase in the conversion to which the monomer polymerization is taken. They appear to be best at 100% conversion when butadiene-1,3 is the sole monomer.

After the polymerization reaction has been completed, the halogen-containing liquid polymer is recovered by coagulation from the latex in which it is obtained. The usual method of recovering solid rubbery polymers from their latexes is to first subject the latex to a stripping step to remove unreacted monomers, then to coagulate the polymers by mixing the latex with an aqueous solution of an ionizable salt and/or acid and finally to filter off, water-wash and dry the coagulated polymer. This procedure is not very satisfactory for the liquid polymers in the present case since it does not provide for the removal of low molecular weight monofunctional molecules which are also usually formed and which interfere with subsequent curing operations to which the liquid polymers are subjected. Thus the full potential of the properties of the liquid polymers cannot be realized. It has been found that if prior to drying, the coagulated liquid polymer is given a wash with a material such as acetone or a low molecular weight alcohol such as ethanol in which the low molecular weight monofunctional cure interfering fraction is soluble but in which the difunctional higher molecular weight liquid polymer is insoluble, a very satisfactory product is obtained. Another satisfactory but more expensive method of purification is to subject the polymer to one or more acetone or alcohol precipitations from solution in a solvent such as benzene or toluene.

The amine salt component of the composition of the present invention is defined as the addition product of an amine with an acid. Such salts are formed by the reaction of a primary, secondary or tertiary amine with a mineral acid or an organic acid such as acetic, picric, oxalic, picrolonic, styphnic, etc. The preferred amine salts, such as the carbonate of hexamethylene diamine, the borate of hexamethylene diamine, the hydroiodide of methylated hexamethylene diamine, the hydro-bromide of methylated diethylene triamine, the hydro-chloride of methylated triethylene tetramine, and the like, are salts of multifunctional amines.

It has been found that in the presence of moisture the above described amine salts act as vulcanizing agents at ambient temperatures for the liquid polymer of this invention, solid rubbery products being obtained. Since amine salts have different chemical properties from those of the parent amines, the finding that amine salts can also act as vulcanizing agents for the aforementioned liquid polymer, but only under non-anhydrous conditions, was unexpected.

The amount of amine salt used is minor to the amount of liquid polymer and will normally be in the range of about 0.5–15 parts by weight per 100 parts by weight of polymer and preferably in the range of about 1–10 parts by weight. Vulcanizing agents having a functionality of four or more are particularly suitable since they can tie up a moderate amount of cure-interfering mono-functional polymer chains and still allow for chain extension of the difunctional polymer to obtain satisfactory physical properties.

The rate of vulcanization of the liquid polymer of this invention will vary depending on the ambient temperature (usually 60–100° F.), the relative humidity, the amount and type of salt employed, the activity of the polymer and the parent amine, etc. The rate of vulcanization of the liquid polymer may be greatly increased by the release of the parent amine through the incorporation of a moisture-activated reactive compound into the polymer-amine salt mixture; the function of the reactive compound being to provide directly, or indirectly by reaction with moisture, a reagent capable of reacting with the acid portion of the amine salt in order that the parent amine of the salt may be liberated. The amount of reactive compound used may be from 0.5–20 parts by weight per 100 parts by weight of liquid polymer, and preferably from 1–10 parts by weight.

Reagents capable of reacting directly with the acid portion of the amine salt in the presence of moisture include strong bases and salts of strong bases and weak acids. Examples of strong bases include sodium hydroxide and potassium hydroxide. The salts of strong bases and weak acids are the preferred reagents, examples of which include sodium acetate, sodium formate, sodium stearate, potassium oleate, and the like.

Moisture-reactive chemicals which after reaction with water at room temperature yield reagents capable of reacting with the acid portion of the amine salt include moisture-reactive metallic nitrides, amides, hydrides, carbides, phosphides, etc. and calcium cyanamide. Nitrides, such as those of sodium, potassium, calcium, zinc, magnesium, aluminum, etc., are preferred.

Compounding ingredients, such as fillers, colouring pigments, tackifiers, and plasticizers also may be incorporated into the compositions of this invention. Examples of fillers include carbon blacks, powdered metals, silicas, clays, calcium carbonate, metal oxides, etc. The plasticizer used must be compatible with the liquid polymer. Suitable plasticizers include paraffinic and naphthenic oils, esters, chlorinated polyphenyls, etc.

The following examples will further illustrate the invention. In these examples, all parts are parts by weight unless specified otherwise.

EXAMPLE I 100 parts of butadiene and 10 parts of tetrabromomethane were emulsified in 180 parts of water containing 5 parts of dissolved sodium alkyl aryl sulfonate and 5 parts of dissolved tri-potassium phosphate buffer. After raising the temperature of the system to 140° F., 0.3 part of potassium persulfate was added. A further 0.6 part of potassium persulfate was added, in increments, to the agitated emulsion during the course of the reaction. After 67 hours, 95% of the butadiene was converted to polymer in the form of an aqueous latex. The polymer was recovered by coagulation with methanol, then purified by dissolving in benzene and precipitating with acetone followed by drying under vacuum at 200° F. 1.25 parts of methylene-bis (2-nonyl-4-methyl) phenol antioxidant were added prior to the vacuum drying step. The dried polymer was a water-white viscous liquid having an intrinsic viscosity in toluene at 30° C. of 0.38 and a combined bromine content of 3.7 weight percent.

The hydrochloride of methylated triethylene tetramine was prepared by adding excess concentrated hydrochloric acid to a 30% solution of the amine in water. The dried amine salt was obtained after evaporation of its solution to dryness and vacuum drying at 177° F. A fine dispersion of the amine salt in the form of a paste was prepared by passing a mixture of 2 parts by weight of petrolatum and 1 part by weight of amine salt 3 times through a paint mill. The paste was stored in a dry air atmosphere.

10 parts by weight of the methylated triethylene tetramine hydrochloride paste was added to 100 parts by weight of the above described liquid polymer, the ingredients being mixed rapidly so as to minimize exposure to air. One portion of the mixture was immediately transferred to a dry air atmosphere and the remainder was exposed to the atmosphere at a relative humidity of 45% and a temperature of 77° F. After 24 hours the sample exposed to the atmosphere showed a considerable increase in viscosity; curing continued on further standing, an elastic and non-tacky vulcanizate resulting after 2 weeks. The sample stored in dry air was completely uncured after 6 weeks.

These results indicate that methylated triethylene tetramine hydrochloride acts as a vulcanizing agent for liquid terminally brominated polybutadiene in the presence of moisture.

EXAMPLE II

The procedure of Example I was repeated, except that an additional 20 parts by weight of a petrolatum paste, containing one-third by weight of one of the chemical compounds listed below, were added to samples of the mixture of 10 parts by weight of methylated triethylene tetramine hydrochloride paste and 100 parts of the liquid polymer of Example I. The chemicals which were used in the form of pastes were sodium acetate, sodium formate, sodium stearate, potassium oleate, calcium hydride and magnesium nitride. After 24 hours all the exposed samples had set up to non-tacky, elastic masses.

Since magnesium nitride and calcium hydride cannot be exposed to moisture without the occurrence of decomposition, the following technique was used to prepare their respective pastes. 2 parts by weight of petrolatum, 1 part by weight of nitride or hydride and 3 parts by weight of pentane were weighed under nitrogen into a dry vessel containing ball bearings. The closed container was then agitated to pulverize the nitride or hydride. The pentane was evaporated off under a steam of nitrogen and the pastes were stored in a dry air atmosphere.

The results taken in conjunction with those of Example I, indicate that the above chemicals increase the rate of cure of liquid brominated polybutadiene in admixture with methylated triethylene tetramine hydrochloride.

EXAMPLE III

The procedure of Example II was repeated, except that the petrolatum-reagent chemical pastes were prepared in a dry air atmosphere.

Observations of state of cure of the various mixes, compositional details of which are given below, were made at selected intervals, the results being described in this and succeeding examples by the following abbreviations:

O=no cure
A=appreciable set-up
B=definite set-up but tacky and inelastic
C=elastic properties but tacky and weak
D=elastic properties, dry surface
E=good firm cure
P=porous sample The following observations were made:

| Sample No. | 1 | 2 | 3 | 4 | 5 | 6 | 7 | 8 | 9 |
|---|---|---|---|---|---|---|---|---|---|
| Brominated liquid polybutadiene | 100 | 100 | 100 | 100 | 100 | 100 | 100 | 100 | 100 |
| Methylated triethylene tetramine hydrochloride paste | 9 | 6 | 6 | 6 | 6 | 6 | 6 | 6 | |
| Sodium acetate paste | | | 9 | | | | | | |
| Sodium formate paste | | | | 9 | | | | | |
| Sodium stearate paste | | | | | 9 | | | | |
| Potassium oleate paste | | | | | | 9 | | | |
| Calcium hydride paste | | | | | | | 9 | | |
| Magnesium nitride paste | | | | | | | | 9 | 9 |

| Exposure time at 45% relative humidity and 77° F. (days) | State of Cure | | | | | | | |
|---|---|---|---|---|---|---|---|---|
| 1 | A | A | A | A | A | B | P | D | O |
| 2 | B | A | B | B | A | B | P | D | O |
| 5 | C | C | C | B | C | C | P | DE | O |
| 7 | C | C | D | C | C | D | PC | E | O |
| 9 | CD | C | D | CD | D | D | PC | E | O |
| 12 | CD | C | D | D | D | D | PD | E | O |
| 15 | D | C | E | E | DE | DE | PE | E | O |

Samples 1–6 and 8 were tested for stress-strain properties; the results are presented in Table I.

TABLE I

| Sample No | 1 | 2 | 3 | 4 | 5 | 6 | 7 | 8 |
|---|---|---|---|---|---|---|---|---|
| Exposure time at 45% relative humidity and 77° F. (days) | 30 | 30 | 30 | 30 | 30 | 30 | 30 | 9 |
| Tensile strength (p.s.i.) | 85 | 60 | 90 | 80 | 105 | 100 | 190 | 160 |
| Elongation (percent) | 860 | 1,100 | 510 | 680 | 770 | 825 | 340 | 380 |
| 100% modulus (p.s.i.) | 15 | 10 | 35 | 20 | 25 | 20 | 95 | 70 |
| 300% modulus (p.s.i.) | 25 | 15 | 55 | 35 | 35 | 30 | 165 | 130 |

The results indicate that the above chemicals increase the rate of cure of liquid brominated polybutadiene in admixture with methylated triethylene tetramine hydrochloride. Magnesium nitride, which was the most effective accelerator, does not independently cure the liquid polymer.

EXAMPLE IV

The procedure of Example III was repeated, except that methylated hexamethylene diamine hydrochloride was also used. The two amine hydrochlorides used in these examples were prepared by a similar method. The composition of the mixes, observations of state of cure and stress-strain properties are presented below in Table II.

TABLE II

| Sample No | 1 | 2 | 3 | 4 | 5 | 6 | 7 | 8 |
|---|---|---|---|---|---|---|---|---|
| Brominated liquid polybutadiene | 100 | 100 | 100 | 100 | 100 | 100 | 100 | 100 |
| Methylated hexamethylene diamine hydrochloride paste | 8.5 | 8.5 | 12.5 | 12.5 | | | | |
| Methylated triethylene tetramine hydrochloride paste | | | | | 10 | 10 | 15 | 15 |
| Magnesium nitride paste | 6 | 9 | 6 | 9 | 6 | 9 | 6 | 9 |
| State of cure after exposure at 45% relative humidity and 77° F. (days): | | | | | | | | |
| 1 | C | C | C | C | D | D | D | D |
| 4 | C | D | D | D | E | E | E | E |
| Stress-strain properties after 14 days exposure 45% relative humidity and 77° F.: | | | | | | | | |
| Tensile strength (p.s.i.) | 45 | 60 | 130 | 55 | 270 | 295 | 200 | 195 |
| Elongation (percent) | 1,100 | 1,145 | 845 | 1,080 | 510 | 505 | 550 | 410 |
| 100% modulus (p.s.i.) | 10 | 20 | 40 | 20 | 95 | 110 | 70 | 105 |
| 300% modulus (p.s.i.) | 10 | 25 | 55 | 25 | 165 | 185 | 115 | 165 |

Samples of the above compounds which had been stored in a dry atmosphere for 24 days remained uncured.

These results indicate that methylated hexamethylene diamine hydrochloride may be used as a vulcanizing agent for liquid brominated polybutadiene.

EXAMPLE V 100 parts by weight of the liquid brominated polybutadiene of Example I were mixed on a 3 roll paint mill with 50 parts by weight of semi-reinforcing furnace carbon black, 40 parts by weight of a paraffinic oil having a specific gravity of 0.87 and a viscosity SUS (Saybolt Universal Seconds) of 40 at 210° F. and 10 parts by weight of low density grade polyethylene having a melt flow index of about 25. The mixture was dried under vacuum at 80° C. 15 parts by weight of the methylated tetraethylene tetramine hydrochloride paste of Example I and 10 parts by weight of the magnesium nitride paste of Example II were added to the above mixture in a dry air atmosphere.

A portion of the above compound was exposed in the form of a thin sheet to the atmosphere at a relative humidity of 45% and a temperature of 77° F. while the remainder was stored in a dry air atmosphere. After 10 days the exposed sample had the following stress-strain properties:

Tensile strength _____ p.s.i.__ 440
Elongation _____ percent__ 470
100% modulus _____ p.s.i.__ 95
300% modulus _____ p.s.i.__ 245

The unexposed compound remained uncured after 10 days storage in dry air.

The properties of the above compound indicate that it would be suitable for use in the construction industry as a sealant and caulking compound.

What is claimed is:

1. A substantially anhydrous composition comprising a mixture of (a) a major amount of an aqueous emulsion polymerized undegraded olefinically unsaturated unvulcanized liquid polymer composition containing molecules comprising a polymerized $C_4$–$C_8$ diolefinic hydrocarbon compound, a major proportion of said molecules being characterized by the presence of two terminally located

structures within their molecular structures, where X is a halogen atom selected from bromine, chlorine and iodine, said liquid polymer composition being characterized by an intrinsic viscosity within the range of 0.04–1.0 when measured in toluene at 30° C. and (b) a minor amount of an amine salt which on contact with moisture is capable of linking molecules of said liquid polymer.

2. The composition of claim 1 in which said polymer molecules comprise a polymerized butadiene-1,3.

3. The composition of claim 1 in which X is bromine.

4. The composition of claim 2 in which the amine salt is an addition product of a halogen acid with an amine.

5. The composition of claim 4 in which the amine portion of the amine salt has a functionality of at least four.

6. The composition of claim 5 in which the amine salt is the hydrochloride of an amine selected from tetramethylene diamine and hexamethyl triethylene tetramine.

7. The composition of claim 2 in which is incorporated about 0.5 to 20 parts by weight per 100 parts by weight of said liquid polymer of a moisture-activatable compound which in the presence of water reacts, directly or indirectly after decomposition, with the acid portion of the amine salt to release the parent amine.

8. The composition of claim 7 in which the moisture-activatable compound is selected from the group consisting of magnesium nitride, calcium hydride, sodium acetate, sodium formate, sodium stearate and potassium oleate.

9. A process of producing a vulcanized composition which comprises homogeneously mixing (a) 100 parts by weight of an aqueous emulsion polymerized undegraded liquid polymer composition containing molecules comprising polymerized butadiene-1,3, a major proportion of said molecules being characterized by two

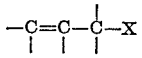

structures located at terminal positions in the polymer molecules, where X is a halogen atom selected from bromine, chlorine and iodine, said liquid polymer composition being characterized by an intrinsic viscosity within the range of 0.04–1.0 when measured in toluene at 30° C., (b) about 0.5–15 parts by weight of an amine salt which on contact with moisture is capable of linking molecules of the said liquid polymer, said amine salt being a salt of a multifunctional amine, (c) about 0.5–20 parts by weight of a moisture-activatable compound which reacts directly, or indirectly after decomposition with moisture, with the acid portion of the said amine salt to release the parent amine, and (d) 0 to about 25 parts by weight of a solid polymer selected from polyethylene, polypropylene, ethylene-propylene copolymer containing more than about 80 mole percent ethylene, ethylenevinyl acetate copolymer, trans-1,4 polyisoprene and trans-1,4 polybutadiene, and contacting said admixture with moisture.

References Cited

UNITED STATES PATENTS

| | | | |
|---|---|---|---|
| 2,395,507 | 2/1946 | Sauser | 106—285 |
| 2,459,742 | 1/1949 | Bradley et al. | 260—92.3 |
| 2,900,292 | 4/1959 | Coleman et al. | 260—92.3 |

DONALD E. CZAJA, Primary Examiner

D. J. BARRACK, Assistant Examiner

US. Cl. X.R.

260—33.6, 33.8, 41, 41.5, 94.7, 890